US012801346B2

(12) United States Patent
Avudaiyappan et al.

(10) Patent No.: US 12,801,346 B2
(45) Date of Patent: Nov. 17, 2026

(54) MULTIPLY-ACCUMULATOR ARRAY CIRCUIT WITH ACTIVATION CACHE

(71) Applicant: Microsoft Technology Licensing, LLC, Redmond, WA (US)

(72) Inventors: Karthikeyan Avudaiyappan, Sunnyvale, CA (US); Jeffrey A Andrews, Sunnyvale, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1144 days.

(21) Appl. No.: 17/590,798

(22) Filed: Feb. 1, 2022

(65) Prior Publication Data

US 2023/0244448 A1 Aug. 3, 2023

(51) Int. Cl.
*G06F 7/544* (2006.01)

(52) U.S. Cl.
CPC .................................. *G06F 7/5443* (2013.01)

(58) Field of Classification Search
CPC ..................................................... G06F 7/5443
See application file for complete search history.

(56) References Cited

U.S. PATENT DOCUMENTS 11,157,287 B2 * 10/2021 Talpes ................. G06F 13/1642
2012/0079283 A1 * 3/2012 Hashimoto ............. G06F 21/64 713/189
2013/0046943 A1 * 2/2013 Ono .................... G11C 11/4076 711/E12.071
2014/0208109 A1 * 7/2014 Narendra Trivedi ... G06F 21/78 713/170
2018/0341495 A1 11/2018 Culurciello et al.
2019/0026237 A1 * 1/2019 Talpes ................... G06F 3/0631
2020/0104167 A1 * 4/2020 Chen .................... G06V 40/174
2021/0004668 A1 * 1/2021 Moshovos ............. G06N 3/048
2021/0192359 A1 * 6/2021 Khish Ardestani Zadeh ............. G06N 3/063
2022/0019408 A1 1/2022 Kim
2022/0188604 A1 * 6/2022 Zuolo .................... G06N 3/048

FOREIGN PATENT DOCUMENTS

CN 106503797 A 3/2017
CN 112424745 A 2/2021
(Continued)

OTHER PUBLICATIONS

A. Zaidy, A. X. Ming Chang, V. Gokhale and E. Culurciello, "A High Efficiency Accelerator for Deep Neural Networks," 2018 1st Workshop on Energy Efficient Machine Learning and Cognitive Computing for Embedded Applications (EMC2), Williamsburg, VA, USA, 2018, pp. 9-13. (Year: 2018).*
(Continued)

*Primary Examiner* — James Trujillo
*Assistant Examiner* — Markus Anthony Villanueva

(57) ABSTRACT

Embodiments of the present disclosure include a multiply-accumulator (MAC) array circuit comprising an activation cache and a plurality of multiply-accumulator (MA) groups. The activation cache comprises cache lines configured to store sub-slices of an input activation array. The cache lines are coupled to particular MA groups. Activations stored in the cache lines may be used and reused across multiple MA groups.

20 Claims, 6 Drawing Sheets

(56) References Cited

FOREIGN PATENT DOCUMENTS

| | | | | |
|---|---|---|---|---|
| CN | 113011554 A | | 6/2021 | |
| EP | 3836028 A1 | * | 6/2021 | ............. G06N 3/063 |

OTHER PUBLICATIONS

"International Search Report and Written Opinion issued in PCT Application No. PCT/US22/050809", Mailed Date: Mar. 16, 2023, 9 Pages.

First Examination Report received for Indian Application No. 202417056910, mailed on Feb. 4, 2026, 7 pages.

Office Action and Search Report Received for Taiwan Application No. 111150856, mailed on Aug. 3, 2026, 45 pages (English translation Provided).

* cited by examiner

MULTIPLY-ACCUMULATOR ARRAY CIRCUIT WITH ACTIVATION CACHE

BACKGROUND

The present disclosure relates generally to digital circuits and systems, and in particular to a multiply-accumulator array circuit.

Many modern digital systems and applications benefit from providing functionality to multiply digital values together and obtain results. From graphics processing to artificial intelligence, multiplication of digital values is a functionality in increasing demand. Many of these applications require digital systems that can multiply digital values together and accumulate (e.g., add) the result. These applications may require increasing computational power and efficiency to handle the increasing number of computations required.

Multiply-accumulate (MAC) operations in many systems may vary according to the particular algorithm being executed. One application of a MAC array is to perform 3D convolution, which may involve processing very large input activations arrays. Typically, a MAC array receives input data, such as pixels, for example, and coefficients, such as neural network weights, for example. Input data is referred to herein as "activations." To perform 3D convolutions on large input activation tensors, many MAC operations are required. Such a large number of MAC operations can be realized using one large MAC array. However, in some instances, a single large MAC array is not desirable from a performance point of view because the large MAC array may not begin processing until after all the activations are fetched, and the fetch may happen at a lower rate due to inherent limitations in fetch bandwidth. Additionally, it may be desirable to speed up MAC array operations when there are zeros. Techniques for skipping multiplications involving zero value activations or weights are referred to as sparsity speed up. However, zero value activations or weights may be spread across a large MAC array such that different sections of the array encounter different sparsity speed-ups, which results in different parts of the MAC array completing processing at different times.

For these and other reasons, it would be advantageous to have a new architecture that does not employ a single large MAC array.

DETAILED DESCRIPTION

Described herein is a multiply-accumulate array circuit with an activation cache. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
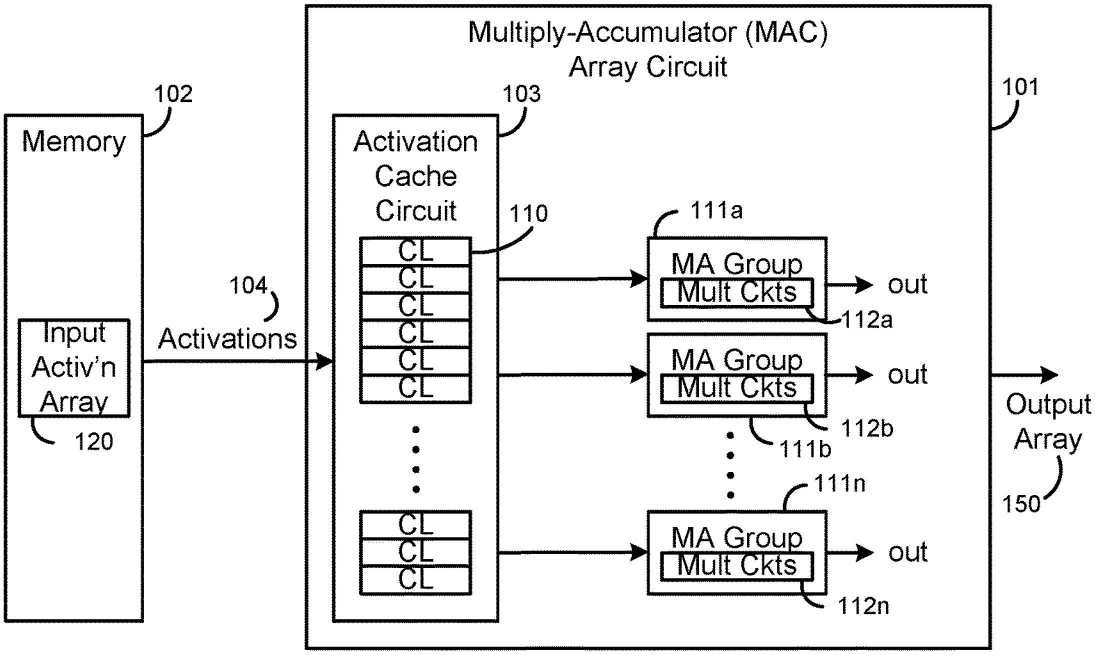
FIG. 1 illustrates a multiply-accumulate array circuit according to an embodiment.

FIG. 1 illustrates a multiply-accumulate (MAC) array circuit according to an embodiment. Embodiments of the present disclosure may include a MAC array circuit 101 comprising a plurality of multiply-accumulator circuit (MA) groups 111*a-n*. The MA groups 111*a-n* each include a plurality of multiplier circuits 112*a-n*. Multiplier circuits 112*a-n* may be circuits for multiplying two values (e.g., an activation and a coefficient or weight). Each multiplier circuit 112*a-n* may include circuitry for accumulating (adding) the output of the multipliers, for example. Advantageously, many small MA groups may begin their operations as soon as the particular MA groups' piece of input activation has been fetched. Further, using multiple smaller MA groups may facilitate floor planning and layout because one large monolithic block occupies a large contiguous area, and it may be more difficult to place in a floorplan and implement a layout, for example.

Features and advantages of the present disclosure include an activation cache circuit 103. Activation cache circuit 103 may store portions of an input activation array, such as input activation array 120 received from a memory 102, for example, in such a way that activations may be used (and reused) across multiple MA groups without requiring redundant fetches and to more efficiently provide inputs across the MA groups for particular operations. Referring again to FIG. 1, the activation cache circuit 103 is configured to receive one or more sub-slices of activations 104 from an input activation array 120. Activation cache circuit 103 may include a plurality of cache lines 110, which are coupled to the MA groups 111*a-n*. Cache lines 110 may be configured to store spatially local activations from the sub-slice of activations. For example, various applications may involve activations that have a spatial relationship within the input activation array (e.g., pixels). It is to be understood that a variety of types of information may be embedded in activations using various forms of spatial locality, for example. In some embodiments, spatially local activations may refer to activations that are adjacent to (or nearby) each other in the input activation array, for example, such as a block of pixels.

During processing, an MA group may be coupled to a portion of the plurality of cache lines 110 comprising spatially local activations from the sub-slice of activations. A particular MA group may receive activations from one or more same shared cache lines as at least one other MA group, for example (as well as activations that may not be shared across multiple MA groups). Each MA group may process the spatially local activations from the sub-slice of activations and generate an output, which is a portion of an output array.

One advantage of some embodiments of the present disclosure pertains to sparsity speed up. As mentioned above, using multiple MA groups allows activations to be efficiently loaded as sub-slices. In some embodiments, multiplier circuits may run independently (e.g., so some multiplier circuits may skip activations or coefficients with zeros). Even though these multipliers run independently, they collectively work on one input activation tensor to perform an operation (e.g., 3D-convolution) and produce one output activation tensor. Coupling spatially local activations from reusable cache lines in an activation cache to multiple smaller MA groups to produce a single output tensor, while allowing the MA groups to run past each other at different speeds, allows very large input activation arrays to be sliced, sub-sliced, and processed more efficiently, for example. In certain embodiments, storage locations in a cache memory circuit may provide the mechanism for receiving at least one sub-slice of activations from an input activation array and for storing spatially local activations from the sub-slice of activations.

Figure 2:
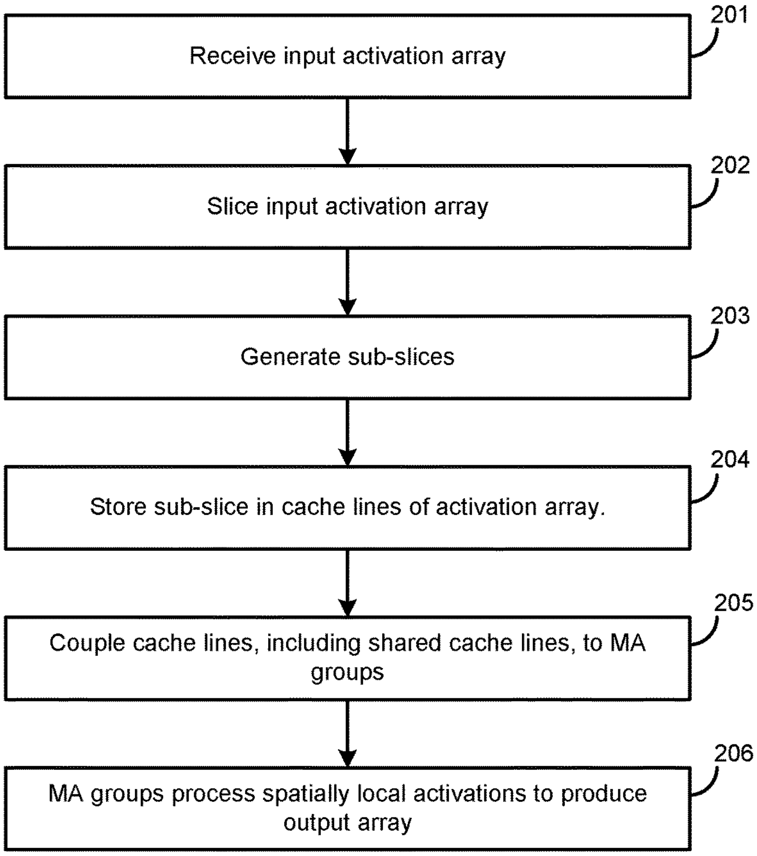
FIG. 2 illustrates a method according to an embodiment.

FIG. 2 illustrates a method according to an embodiment. At 201, an input activation array is received. The input activation array may be received in a memory, which may be integrated on the same substrate as a MAC array circuit (resides on the same chip) or may be external, for example. At 202, the input activation array is sliced in the depth dimension. For example, the activation cache may not have space to keep all the channel elements of a pixel. For an activation array of 1000 channels, each pixel may have 1000 elements behind it. At 2 bytes (B) per element, each pixel (and all its channel elements) is 2 KB in size. In one example implementation, an entire activation cache is only ~6 KB in size. Accordingly, an activation cache may not be able to store the whole array, and thus the input array is advantageously sliced before being loaded into the activation cache. At 203, a slice is divided in spatial dimension such that many sub-slices are generated. The sub-slices may comprise spatially local portions of the input activation array, for example (e.g., blocks of pixels). At 204, the sub-slices are stored in cache lines of an activation cache. At 205, the cache lines, including shared cache lines, are coupled to MA groups. At 206, the MA groups process the activations and produce an output array.

The following figures illustrate various examples of processing an input activation array according to various embodiments.

Figure 3:
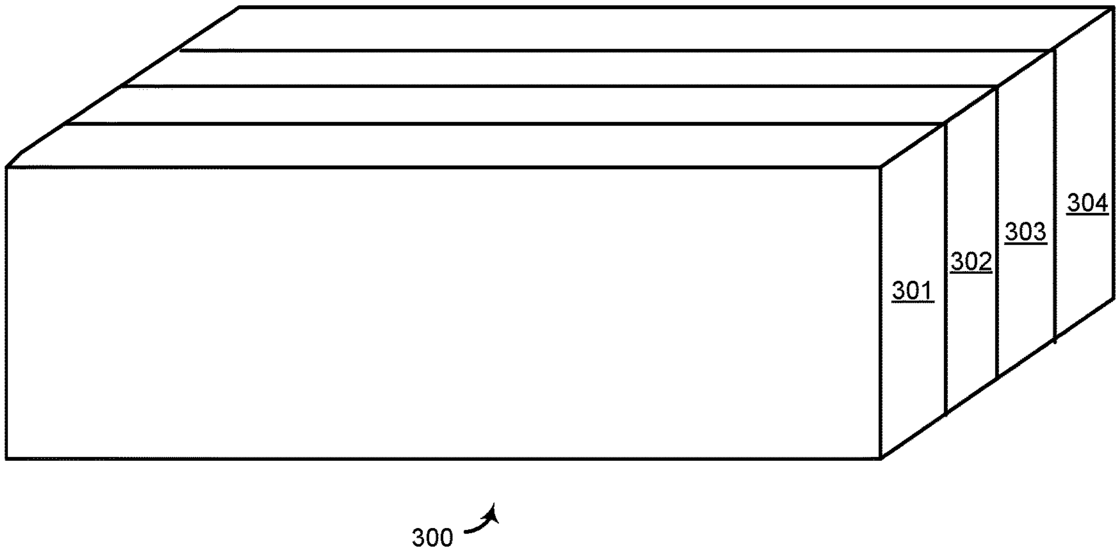
FIG. 3 illustrates an input activation array and slices according to an embodiment.

FIG. 3 illustrates an input activation array 300. In this example, input activation array 300 is sliced in depth dimension (divided) into 4 equal slices 301-304. For instance, input activation array 300 may be Width=1000×Height=1000×Depth=1000 activations, and each slice may be 1000×1000×250.

Figure 4:
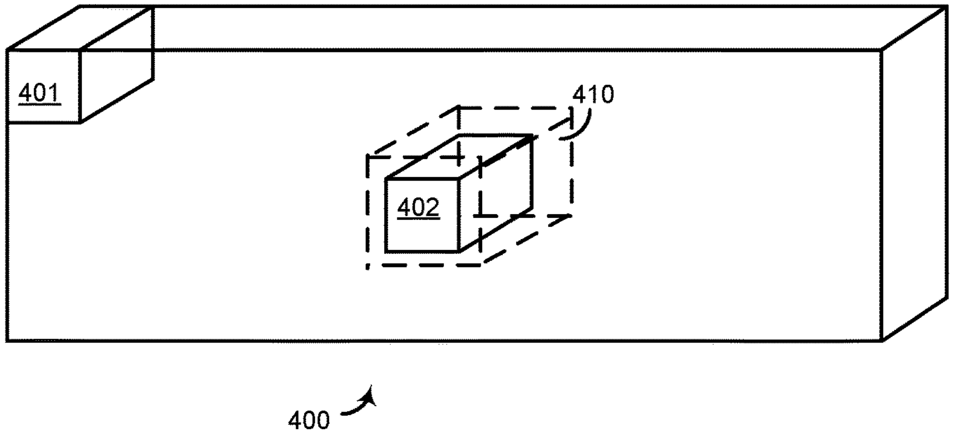
FIG. 4 illustrates sub-slices according to an embodiment.

FIG. 4 illustrates sub-slices according to an embodiment. In this example, one slice 400 of input activation array 300 is sub-sliced (sub-divided) into three-dimensional cubes (sub-slices), such as sub-slice 401 and sub-slice 402. FIG. 4 illustrates that the activations in each sub-slice maintain spatial locality between the activations. These sub-slices may be stored in cache lines as described above and further below. In some embodiments described herein, spatially local activations from adjacent sub-slices are included in the cache lines. For example, sub-slice of activations 402 comprises one cube of activations of a plurality of cubes of activations from a slice 400 of the input activation array. 410 illustrates activations adjacent to edges of the cube 402 of activations. One or more such adjacent activations to a sub-slice of activations is referred to as the "halo" (e.g., a cube of pixels may be adjacent to a plurality of "halo" pixels). As described below, certain embodiments may load halo activations into cache lines. Additionally, FIG. 4 illustrates that some sub-slices (e.g. 401) may have no adjacent activations in all sides. In some cases, zero values are included in cache lines to form a "zero pad" around the sub-slice of activations as described further below.

Figure 5:
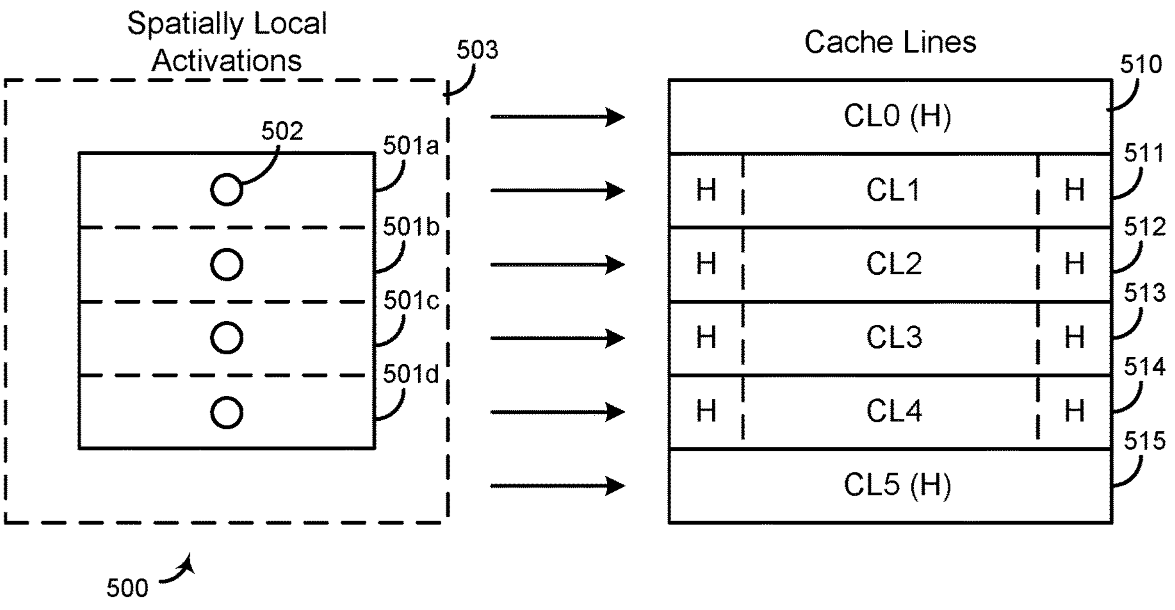
FIG. 5 illustrates loading sub-slices of activations into cache lines according to an embodiment.

FIG. 5 illustrates loading sub-slices of activations into cache lines according to an embodiment. In this example, two (2) dimensions of a sub-slice are illustrated at 500 (e.g., height and width of pixels, but not the depth dimension). The activations are spatially local, and may be pixels, for example. In this example, one or more activations adjacent to the border of the sub-slice may be included for processing, as illustrated at 503. Such activations 503 may be halo activations or zero padded values, for example. In various applications, it may be desirable to identify a center activation, such as a center pixel, for example. For instance, certain operations, such as 3D convolution or filtering, may produce a result corresponding to a particular activation. In this example, each row 501*a-d* of sub-slice 500 may comprise a center activation, such as center activation 502. FIG. 5 illustrates how a sub-slice is stored in cache lines CL0-CL5 510-515 of an activation cache according to an embodiment. In this example, sequential cache lines store sequential rows of a sub-slice. For example, CL0 stores halo activations (H), CL1-CL4 511-514 store activations from rows 501*a-d*, respectively, of sub-slice 500 including left and right halo (H) activations, and CL5 stores halo (H) activations.

In various embodiments, a size (number of activation values) of the cache line is variable length. In one embodiment, the size of the cache lines CL may vary based on a filter size, for example. For example, for a filter having dimensions Fw×Fh (where Fw is the filter width and Fh is the filter height), the number of activations in each cache line for a 3×3 filter may be different than the number of activations in cache lines for a 5×5 filter, 3×2 filter, or 3×4 filter. First, the number of cache lines received by each MA group may be set by the filter height, Fh. Additionally, the number of halo activations used for each cache line may be set by the filter width, Fw (e.g., number of halo or zero pad values may be one minus the filter width (#halo=Fw−1), where half are included on the left and half are included on the right. An odd result for the number of halos may result in different numbers of halos on each side, for example. For example, the size of a cache line may be equal to one (1) minus a filter width plus a number of multiplier circuits along one dimension of particular MA group. As illustrated further below, in some embodiments a state machine may be used to control loading and managing the cache based on the operation being performed, for example.

Figure 6:
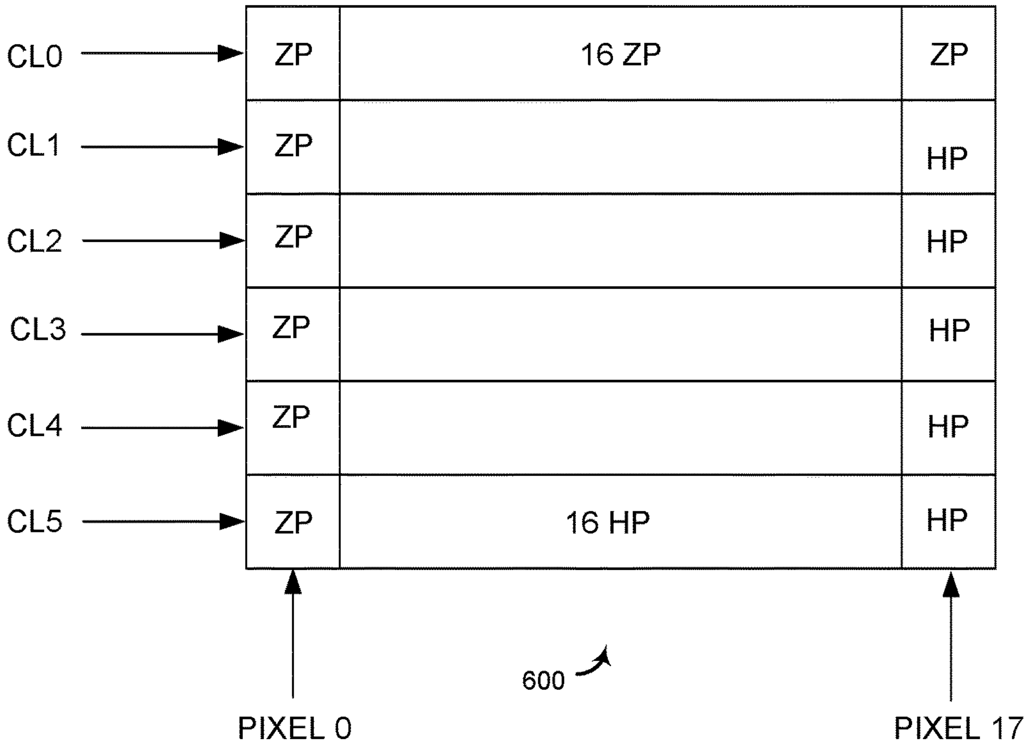
FIG. 6 illustrates example activations in cache lines according to an embodiment.

FIG. 6 illustrates an example of pixels in cache lines according to an embodiment. In this example, CL0 stores a left halo zero pad (ZP), 16 zero pad values (e.g., one for each multiplier in a multiply-accumulator group), and a right zero pad (ZP). CL1-CL4 each store a left ZP, 16 pixel values, and a right halo pixel (HP) from an adjacent sub-slice, for example. CL5 stores a left zero pad (ZP), 16 halo pixel (HP) values, and a right halo pixel (HP). Sub-slice 600 may correspond to an upper left hand sub-slice of pixels from a pixel array in the same position as sub-slice 401 in FIG. 4, for example.

Figure 7:
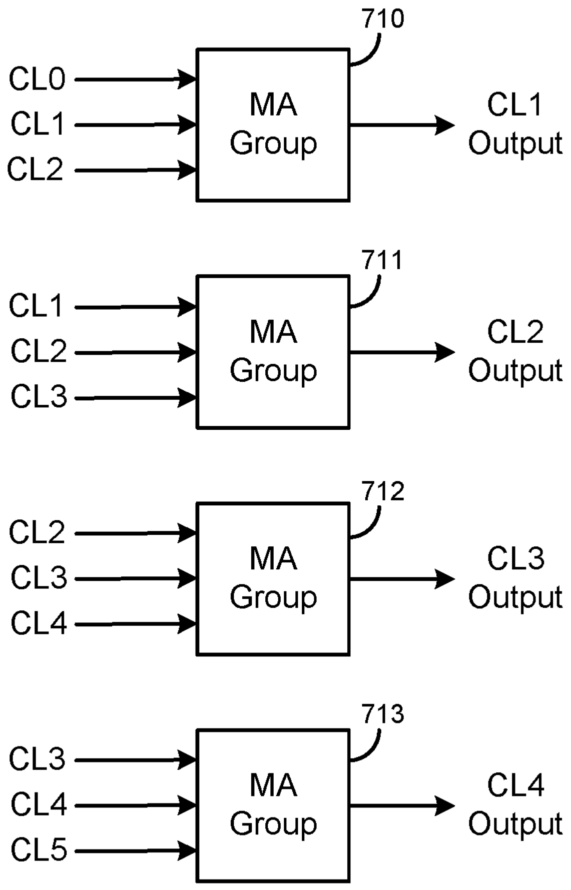
FIG. 7 illustrates coupling activations in cache lines to multiply-accumulator circuit groups according to an embodiment.

FIG. 7 illustrates coupling activations in cache lines to multiply-accumulator circuit (MA) groups according to an embodiment. FIG. 7 illustrates one example of how a particular MA group is coupled to a portion of the plurality of cache lines and one or more same shared cache lines as other multiply-accumulator circuit groups. In this example, the cache lines are staggered across MA groups 710-713. Staggered cache lines are arranged in a series of overlapping intervals across MA groups. As but one example, MA group 710 is coupled to cache lines CL0-CL2, MA group 711 is coupled to cache lines CL1-CL3, MA group 712 is coupled to cache lines CL2-CL4, and MA group 713 is coupled to cache lines CL3-CL5. FIG. 7 illustrates that each MA group may produce an output corresponding to a particular center activation. MA group 710 produces an output corresponding to activations in cache line CL1, MA group 711 produces an output corresponding to activations in cache line CL2, MA group 712 produces an output corresponding to activations in cache line CL3, and MA group 713 produces an output corresponding to activations in cache line CL4. In this example, each MA group produces one row of 16 pixels, all of which may be referred to as center pixels. In general, a "center" activation or pixel is that as FIG. 7 indicates: CL1 is in the center of the three cache lines that go to MA group 710, CL2 is in the center of the three cache lines that go to MA group 711, and so on.

The following description illustrates one example of processing activations according to an embodiment. In this example, the activations are pixels (pixel values) and each MA group may receive 16 pixels per cycle. For example, each MA group may include 16 rows of multipliers, and each row may have 16 columns of multipliers. If the 16 extracted pixels from a CL are referred to as EP0 through EP15, then EP0 is sent to all columns of row 0, EP1 is sent to all columns of row 1, and so on such that EP15 is sent to all columns of row 15. For example, for MA group 710, in the first cycle, counting from left, pixel 0 from CL0 is the EP0 and it goes to row 0 of MAO. In the second cycle, pixel 1 from CL0 is the EP0 and it goes to row 0 of MAO. Accordingly, these 16 pixels are extracted from the 18 pixels in each CL. Each CL supplies three sets of 16 pixels over 3 cycles. Thus, it takes 9 cycles for 3 CLs to supply 9×16 input pixels to the MA.

In the first cycle, counting from left, pixels 0 (the left most pixel) through 15 from CL0 are supplied to MA group 710. In the second cycle, counting from left, pixels 1 through 16 from CL0 are supplied to MA group 710. In the third cycle, pixels 2 through 17 (the right most pixel) from CL0 are supplied to MA group 710. In the fourth cycle, pixels 0 through 15 from CL1 are supplied to MA group 710. In the fifth cycle, pixels 1 through 16 from CL1 are supplied to MA group 710. In the sixth cycle, pixels 2 through 17 from CL1 are supplied to MA group 710. In the seventh cycle, pixels 0 through 15 from CL2 are supplied to MA group 710. In the eighth cycle, pixels 1 through 16 from CL2 are supplied to MA group 710. In the nineth cycle, pixels 2 through 17 from CL2 are supplied to MA group 710.

Accordingly, it may be advantageous to operate multiple smaller MAC arrays (MA groups) instead of one large MAC array, as it allows each MA group to run independent of other MA groups with which they are operating together to produce a large output tensor. In certain embodiments, even though each MA group runs independent of the other MA groups, among MA groups there is sharing of cache lines of activations. The activation cache takes advantage of the temporal locality of reference of cache lines of activations among MA groups. The cache lines are advantageously formed by dividing a tensor into slices and sub-slices, and each cache line may include activations from neighboring sub-slices as described above, for example.

Figure 8:
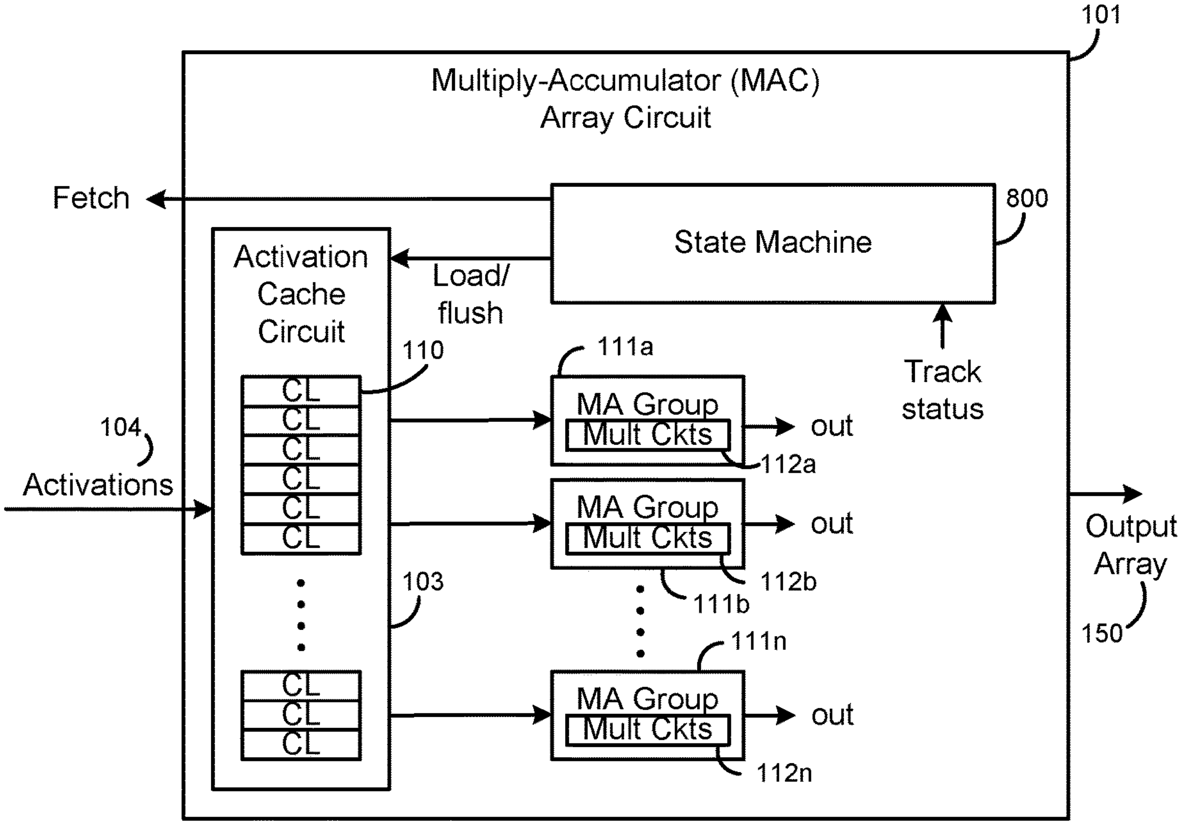
FIG. 8 illustrates an example MAC array circuit architecture according to another embodiment.

WM FIG. 8 illustrates an example MAC array circuit architecture according to another embodiment. In various embodiments, loading and control of the activation cache may be performed by a state machine 800. State machine 800 may track status of the MA groups to determine when to load new activations from cache lines into each MA group, delete (flush) cache lines, and/or load activations into the cache lines as well as configure the size of the cache lines and halo activations and/or zero paddings, for example. In some embodiments, state machine 800 may receive an operation type (e.g., 3×3 filter or 3×4 filter), divide an input tensor into slice, divide a slice into sub-slice, and divide a sub-slice into multiple variable-length cache lines, which may include halos and center pixels, and cache the formed cache lines in the activation cache 103. In various embodiments, sub-slices may be sized based on two things: 1) number of center pixels, which is decided by the number of rows in a MA group and 2) filter size, for example. As mentioned above, cache line size may vary based on the filter dimension. Accordingly, state machine 800 may receive filter dimension information, which dictates the size of the halos, for example. On the other hand, the number of center pixels is dependent on the size of the MA group. In FIG. 6, the MA group may be a 16×16 array of multipliers, for example. Additionally, state machine 800 may control the supply of cache lines to the MA groups, as and when each MA group looks up the activation cache. Because different filter sizes require different numbers of CL inputs to each MA group, state machine 800 may further control which CLs are connected to which MA groups. For example, 3 CL inputs to MA groups may be used for a filter height of 3, and 4 CL inputs to MA groups may be used for a filter height of 4, for example. Furthermore, state machine 800 may track the consumption of each of its cache lines to conclude when to replace them. For example, referring to FIG. 7, CL0 can be replaced in the activation cache as soon as MA group 710 consumes CL0. However, CL1, CL2, CL3, and CL4 cannot be replaced by new cache lines until these cache lines are consumed by all their respective MA group consumers. State machine 800 may track the cache lines based on which cache lines are feeding which MA groups for a particular operation and maintain activations in particular cache lines so they can be reused across MA groups.

Figure 9:
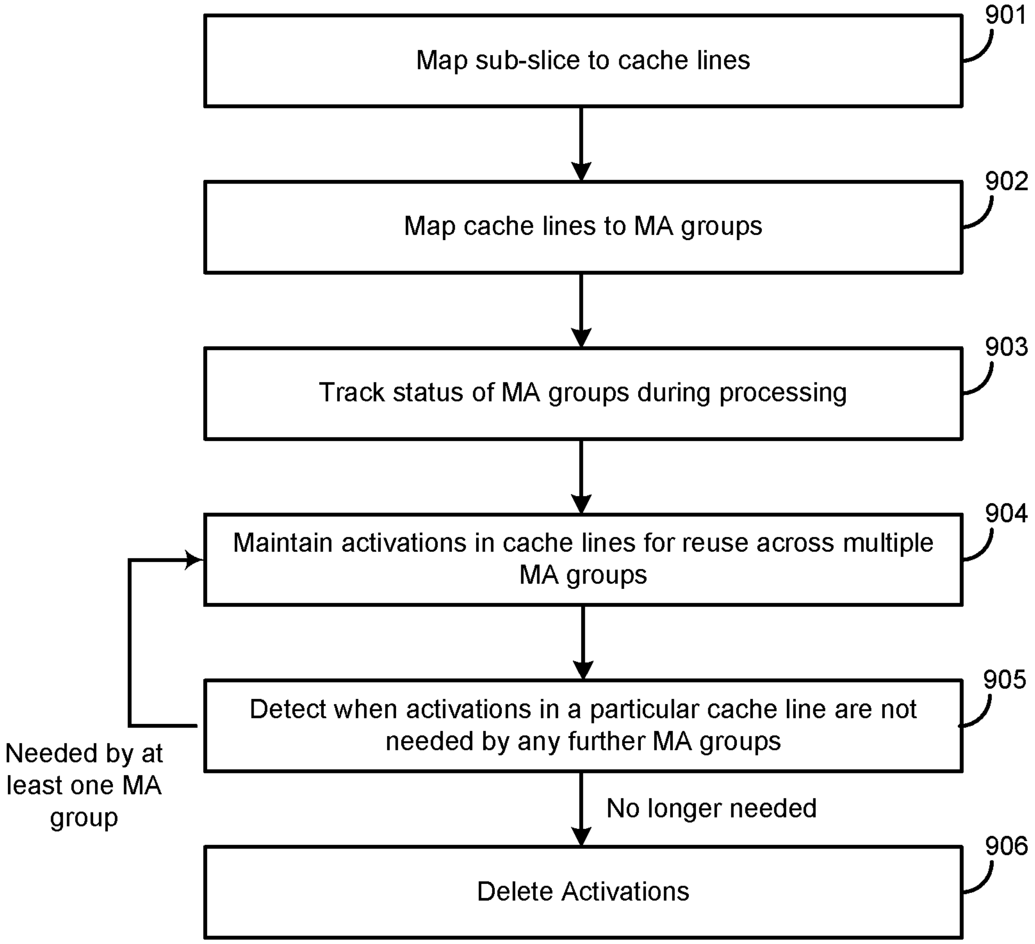
FIG. 9 is a flow chart illustrating the operation of a state machine according to an embodiment.

FIG. 9 is a flow chart illustrating the operation of a state machine according to an embodiment. At 901, sub-slices are mapped to cache lines. Activations received from another memory location may be configured and stored in particular cache lines (e.g., based on filter sizes or other operations parameters). At 902, cache lines are mapped to MA groups. For example, for a 3×3 filter, each MA group may be coupled to 3 cache lines. For a 3×4 filter, each MA group may be coupled to 4 cache lines, for example. At 903, the status of MA groups may be tracked during a processing operation. For example, each multiplier or multiply-accumulator in an MA group may have a status bit indicating the end of an operation. The status of the operations in the MA groups may be tracked to determine when each MA groups is finished using particular activations in particular cache lines. Activations in each cache line may be maintained or deleted based on whether or not any MA groups have further use of the activations. For example, at 904, activations are maintained in cache lines for reuse across multiple MA groups. At 905, the system may detect when activations in particular cache lines are not needed by any further MA groups. If a particular cache line is still needed by an MA group, it is maintained at 904. However, if a particular cache line is not longer needed by any MA groups, then the activations in such a cache line may be deleted, and new activations may be loaded into the cache line, for example.

Further Examples

Each of the following non-limiting features in the following examples may stand on its own or may be combined in various permutations or combinations with one or more of the other features in the examples below.

In one embodiment, the present disclosure includes multiply-accumulator (MAC) array circuit comprising: a plurality of multiply-accumulator circuit groups, the multiply-accumulator circuit groups comprising a plurality of multiplier circuits; and an activation cache circuit, the activation cache circuit configured to receive at least one sub-slice of activations from an input activation array, the activation cache circuit comprising a plurality of cache lines coupled to the plurality of multiply-accumulator circuit groups, the plurality of cache lines configured to store spatially local activations from the sub-slice of activations, wherein a particular multiply-accumulator circuit group is coupled to a portion of the plurality of cache lines comprising spatially local activations from the sub-slice of activations, including one or more same shared cache lines as at least one other multiply-accumulator circuit group, to process the spatially local activations from the sub-slice of activations and generate a portion of an output array.

In another embodiment, the present disclosure includes a method of of processing an input activation array in a multiply-accumulator (MAC) array circuit comprising: receiving at least one sub-slice of activations from an input activation array in a plurality of cache lines of an activation cache circuit, wherein the plurality of cache lines are configured to store spatially local activations from the sub-slice of activations, and wherein plurality of cache lines are coupled to a plurality of multiply-accumulator circuit groups comprising a plurality of multiplier circuits in said multiply-accumulator array circuit; coupling a portion of the plurality of cache lines, including one or more shared cache lines, to a particular multiply-accumulator circuit group to process the spatially local activations from the sub-slice of activations and generate a portion of an output array, wherein shared cache lines are coupled to a first plurality of multiply-accumulator groups of the plurality of multiply-accumulator circuit groups.

In one embodiment, a size the of the cache line is variable length.

In one embodiment, the size of the cache lines vary based on a filter size.

In one embodiment, the size of the cache line is equal to one (1) minus a filter width plus a number of multiplier circuits along one dimension of particular multiply-accumulator circuit group.

In one embodiment, the cache lines are staggered across the plurality of multiply-accumulator circuit groups.

In one embodiment, the cache lines include at least one center activation and at least two halo activations.

In one embodiment, the multiply-accumulator circuit groups process activations independently.

In one embodiment, the circuit further comprises a MAC array state machine configured to map the sub-slice of activations to the plurality of cache lines.

In one embodiment, the circuit further comprises a MAC array state machine configured to track status of the multiply-accumulator circuit groups and delete activations from the cache lines when activations in a particular cache line are no longer needed by any of the multiply-accumulator circuit groups.

In one embodiment, the input activation array is a three-dimensional array of activations, and wherein the sub-slice of activations comprises one cube of activations of a plurality of cubes of activations from a slice of the input activation array.

In one embodiment, the sub-slice of activations comprises activations adjacent to edges of the one cube of activations.

In one embodiment, the sub-slice of activations comprises zero padded activations.

In one embodiment, the sub-slice of activations comprises a plurality of rows of activations, and wherein the rows of activations are stored in a plurality of cache lines.

In one embodiment, the number of activations in the plurality of cache lines varies based on a filter size.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A multiply-accumulator array circuit comprising:

a plurality of multiply-accumulator circuit groups, the multiply-accumulator circuit groups comprising a plurality of multiplier circuits; and an activation cache circuit, the activation cache circuit configured to receive at least one sub-slice of activations from an input activation array, the activation cache circuit comprising a plurality of cache lines coupled to the plurality of multiply-accumulator circuit groups, the plurality of cache lines configured to store spatially local activations from the at least one sub-slice of activations, wherein the plurality of cache lines include a plurality of shared cache lines, wherein each shared cache line of the plurality of shared cache lines is coupled to two or more multiply-accumulator circuit groups of the plurality of multiply-accumulator circuit groups, wherein each of the plurality of multiply-accumulator circuit groups is coupled to a unique subset of the plurality of shared cache lines, wherein each of the plurality of multiply-accumulator circuit groups produce an output corresponding to a particular shared cache line of its respective unique subset, and wherein a particular multiply-accumulator circuit group is coupled to a portion of the plurality of cache lines comprising spatially local activations from the at least one sub-slice of activations, including at least one of the plurality of shared cache lines as at least one other multiply-accumulator circuit group, to process the spatially local activations from the at least one sub-slice of activations and generate a portion of an output array.

2. The circuit of claim 1, wherein a size of the plurality of cache lines is variable length.

3. The circuit of claim 2, wherein the size of the plurality of cache lines varies based on a filter size.

4. The circuit of claim 2, wherein the size of the plurality of cache lines is equal to one (1) minus a filter width plus a number of multiplier circuits along one dimension of a particular multiply-accumulator circuit group.

5. The circuit of claim 1, wherein the plurality of shared cache lines are coupled to the plurality of multiply-accumulator circuit groups in a series of overlapping intervals.

6. The circuit of claim 1, wherein the plurality of cache lines include at least one center activation and at least two halo activations.

7. The circuit of claim 1, wherein the plurality of multiply-accumulator circuit groups process activations independently.

8. The circuit of claim 1, further comprising a multiply-accumulator array state machine configured to map the at least one sub-slice of activations to the plurality of cache lines.

9. The circuit of claim 1, further comprising a multiply-accumulator array state machine configured to track status of the multiply-accumulator circuit groups and delete activations from the plurality of cache lines when activations in a particular cache line are no longer needed by any of the multiply-accumulator circuit groups.

10. The circuit of claim 1, wherein the input activation array is a three-dimensional array of activations, and wherein the at least one sub-slice of activations comprises one cube of activations of a plurality of cubes of activations from a slice of the input activation array.

11. The circuit of claim 10, wherein the at least one sub-slice of activations comprises activations adjacent to edges of the one cube of activations.

12. The circuit of claim 10, wherein the at least one sub-slice of activations comprises zero padded activations.

13. The circuit of claim 10, wherein the at least one sub-slice of activations comprises a plurality of rows of activations, and wherein the rows of activations are stored in the plurality of cache lines.

14. The circuit of claim 13, wherein a number of activations in the plurality of cache lines varies based on a filter size.

15. A method of processing an input activation array in a multiply-accumulator array circuit comprising:

receiving at least one sub-slice of activations from the input activation array in a plurality of cache lines of an activation cache circuit, wherein the plurality of cache lines are configured to store spatially local activations from the at least one sub-slice of activations, wherein the plurality of cache lines are coupled to a plurality of multiply-accumulator circuit groups comprising a plurality of multiplier circuits in said multiply-accumulator array circuit, wherein the plurality of cache lines include a plurality of shared cache lines, wherein each shared cache line of the plurality of shared cache lines is coupled to at least two multiply-accumulator circuit groups of the plurality of multiply-accumulator circuit groups, wherein each of the plurality of multiply-accumulator circuit groups is coupled to a unique subset of the plurality of shared cache lines, wherein each of the plurality of multiply-accumulator circuit groups produce an output corresponding to a particular shared cache line of its respective unique subset; and coupling a portion of the plurality of cache lines, including at least one of the plurality of shared cache lines, to a particular multiply-accumulator circuit group to process the spatially local activations from the at least one sub-slice of activations and generate a portion of an output array.

16. The method of claim 15, wherein a size of the plurality of cache lines vary based on a filter size.

17. The method of claim 15, wherein the plurality of shared cache lines are coupled to the plurality of multiply-accumulator circuit groups in a series of overlapping intervals.

18. The method of claim 15, wherein the input activation array is a three-dimensional array of activations, and wherein the at least one sub-slice of activations comprises one cube of activations of a plurality of cubes of activations from a slice of the input activation array.

19. The method of claim 18, wherein the at least one sub-slice of activations comprises activations adjacent to edges of the one cube of activations.

20. A multiply-accumulator array circuit comprising:

a plurality of multiply-accumulator circuit groups, the multiply-accumulator circuit groups comprising a plurality of multiplier circuits; and an activation cache circuit for receiving at least one sub-slice of activations from an input activation array and for storing spatially local activations from the at least one sub-slice of activations, wherein the activation cache circuit comprises a plurality of shared cache lines, wherein each shared cache line of the plurality of shared cache lines is coupled to two or more multiply-accumulator circuit groups of the plurality of multiply-accumulator circuit groups, wherein each of the plurality of multiply-accumulator circuit groups is coupled to a unique subset of the plurality of shared cache lines, wherein each of the plurality of multiply-accumulator circuit groups produce an output corresponding to a particular shared cache line of its respective unique subset, and wherein a particular multiply-accumulator circuit group is coupled to a portion of the activation cache circuit comprising spatially local activations from the at least one sub-slice of activations, including one or more same shared lines of the plurality of shared cache lines as at least one other multiply-accumulator circuit group, to process the spatially local activations from the at least one sub-slice of activations and generate a portion of an output array.

* * * * *